United States Patent [19]

Engebretsen

[11] 4,227,656
[45] Oct. 14, 1980

[54] VEGETABLE SLICER

[75] Inventor: Einar O. Engebretsen, Troy, Ohio

[73] Assignee: Hobart Corporation, Troy, Ohio

[21] Appl. No.: 972,221

[22] Filed: Dec. 22, 1978

[51] Int. Cl.³ .............................................. B02C 18/00
[52] U.S. Cl. .................................. 241/93; 241/273.1; 241/280
[58] Field of Search ................. 81/3 R, 1 R; 222/386, 222/288, 438; 241/92, 93, 280, 141, 142, 151, 273.1, 273.2, 273.3, 277, 168, 169, 169.1

[56] References Cited

U.S. PATENT DOCUMENTS

| | | | |
|---|---|---|---|
| 2,128,792 | 8/1938 | Beraroucci | 241/93 |
| 2,228,025 | 1/1941 | Apfelbeck | 241/93 |
| 2,271,175 | 1/1942 | Mantelet | 241/93 X |
| 2,352,122 | 6/1944 | Richardson | 241/273.2 X |
| 3,635,270 | 1/1972 | Petroske et al. | 241/93 X |

*Primary Examiner*—Mark Rosenbaum
*Attorney, Agent, or Firm*—Biebel, French & Nauman

[57] ABSTRACT

The pusher plate which pushes foodstuffs through the chute to the food processor in a vegetable slicer is divided, each portion being separately operable and having divider walls for selectively reducing the effective capacity of the chute to expedite handling of small and odd-sized foodstuffs.

9 Claims, 6 Drawing Figures

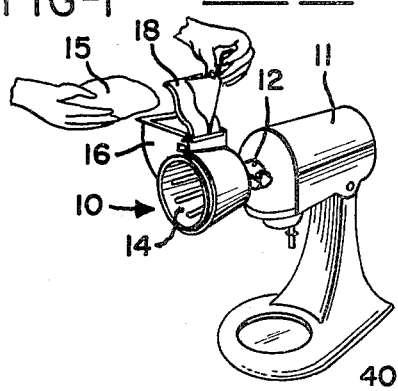
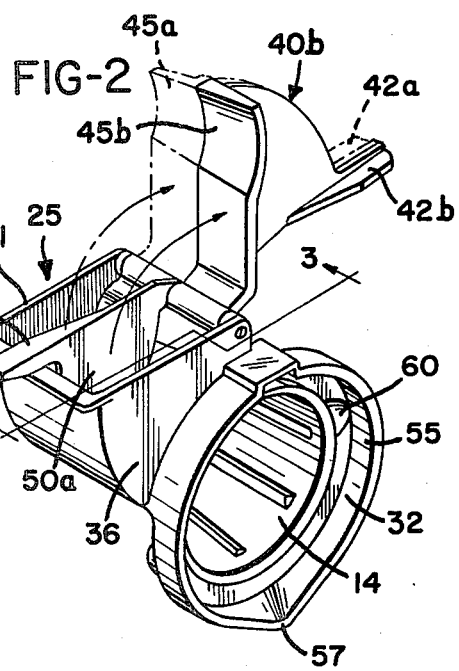
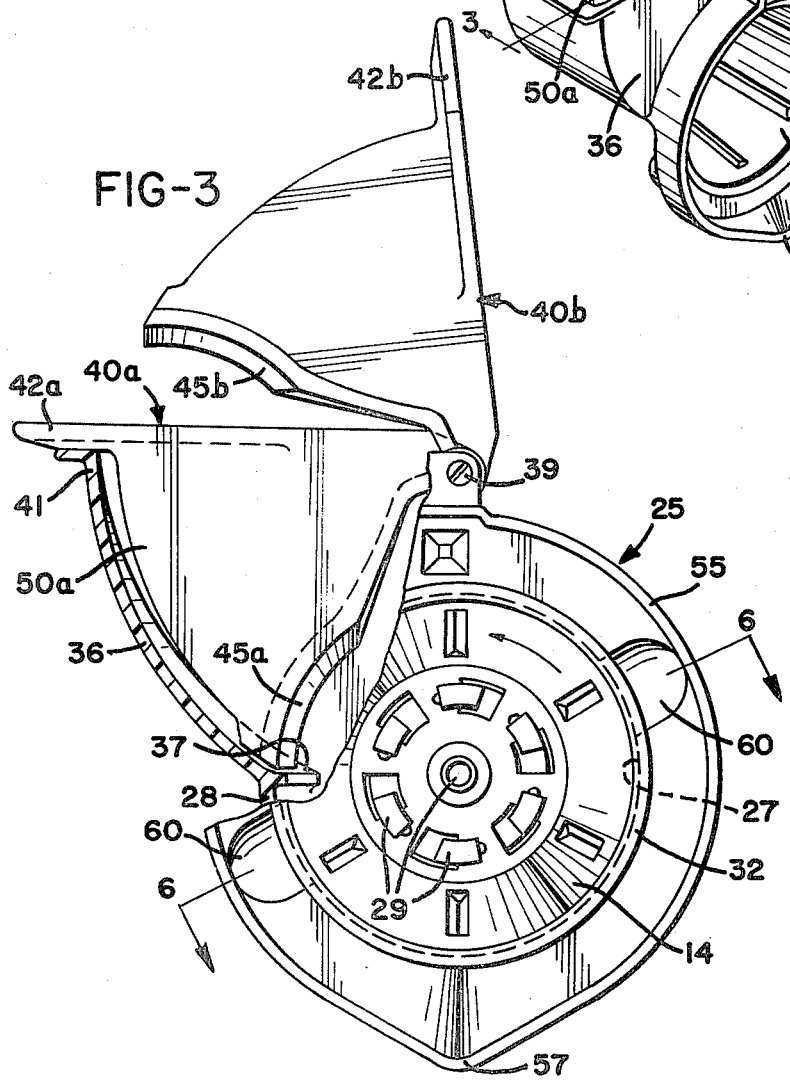

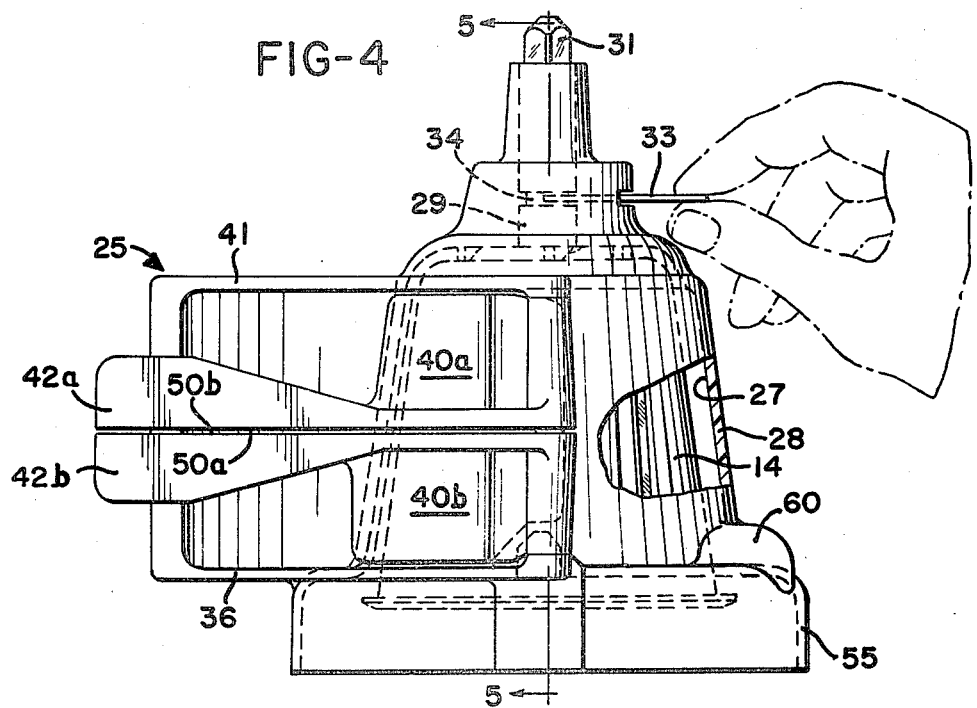
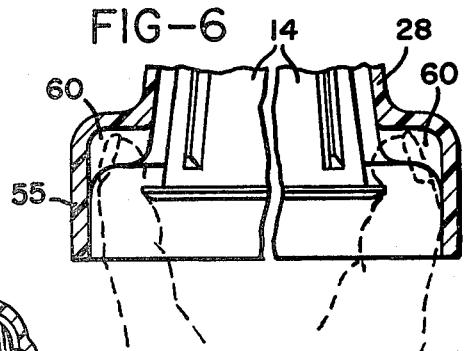
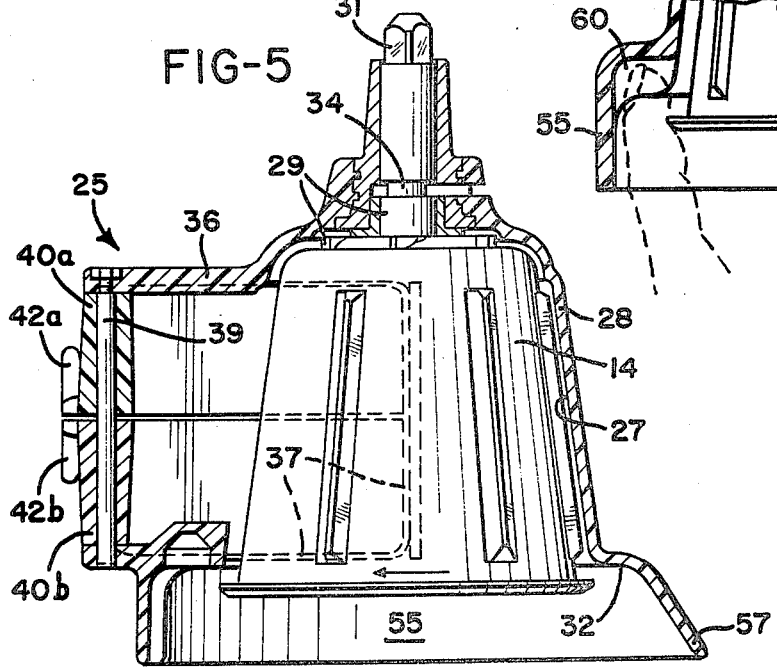

VEGETABLE SLICER

BACKGROUND OF THE INVENTION

The present invention relates to machines commonly called "vegetable slicers," although such machines are used to process many other foodstuffs in addition to vegetables. More particularly, the invention relates to an improved pusher plate configuration for more expeditious handling of small and odd-sized food-stuffs in domestic vegetable slicing machines, where it is desirable to have a single machine which will readily and easily process a wide variety of foodstuffs.

A limitation of such machines results from the very requirement that they must possess this universality, yet be economically priced. Interchangeable slicing cones make it possible to slice potatoes, grate nuts, shred lettuce or cheese, and so on, with equal facility, in several different patterns, within a single housing. However, the housing in particular, and the vegetable slicer in general, must be large enough to accept and process the largest items of food which would be expected in a domestic kitchen. When processing small items of food such as nuts or small pieces of cheese, or foods with odd dimensions such as celery or carrots, the larger dimensions and capacities of the vegetable slicer may prove inconvenient.

A typical prior art machine has a frustoconical cavity in which the slicer cone is coaxially mounted and driven. A chute on the vegetable slicer housing receives and guides the foodstuffs through a port in the side of the cavity and to the slicer cone for processing as the slicer cone is rotated therepast. For convenience in handling the foodstuffs, a pusher plate is hinged to the side of the chute for pushing the foodstuffs through the chute and against the slicer cone.

However, as suggested above, there are certain food processing operations wherein a more specialized slicer would be desirable. For example, in the slicing of celery it is desirable that the celery be fed lengthwise, or linearly. If a large "bunch" of celery stalks is placed in the chute, these can be kept "standing" as they are pushed to and processed by the cone. However, it is difficult to keep a single stalk standing, and if it falls over while being processed alone, the individual slices will be of irregular sizes and shapes. A large piece of cheese, after being shredded, will leave a thin sheet between the pusher plate and the food processing cone. Such a sheet is difficult to process further in a hopper large enough to accept large potatoes.

A need therefore exists for a vegetable slicer of the type described above which can expeditiously and conveniently process both large and small foodstuffs with equal facility and convenience. Such a vegetable slicer must be economical and uncomplicated, and should preferably be immediately operable in either a large or small foodstuff mode, to maximize the convenience and utility of the vegetable slicer for the operator.

SUMMARY OF THE INVENTION

Briefly, the present invention meets the above needs and purposes by dividing the pusher plate into several independently operable portions. In the preferred embodiment, the pusher plate is divided into two such portions, each of which has a divider wall facing its adjacent pusher plate portion. The divider walls close and separate the corresponding portions of the chute from the adjacent pusher plate portions when positioned fully within the chute. Thus, each pusher plate portion may be moved independently through the chute toward and away from the port, and when moved fully into the chute, each will reduce the effective capacity of the chute by an amount equal to the volume of the chute which is swept by the respective face of the particular pusher plate portion. Thus, the capacity of the chute may be reduced approximately by half by simply positioning one of the pusher plate portions within the chute and operating the other for pushing smaller foodstuffs through the balance of the chute and against the slicer cone.

It is therefore an object of the present invention to provide an improved vegetable slicer having a divided pusher plate; in which the several portions of the divided pusher plate have suitable integral divider walls and are independently operable for reducing the effective capacity of the chute for more expeditious handling of small-sized foodstuffs; and to accomplish the above objects and purposes in an uncomplicated, inexpensive, durable and effective configuration readily suited for the convenient processing of a wide variety of foodstuffs.

Other objects and advantages of the invention will be apparent from the following description, the accompanying drawings and the appended claims.

BRIEF DESCRIPTION OF THE DRAWINGS

FIG. 1 is a perspective view of a prior art vegetable slicer mounted on and driven by a food mixer;

FIG. 2 is a perspective view of an improved vegetable slicer according to the present invention;

FIG. 3 is a partially sectioned front view of the FIG. 2 slicer taken generally on line 3—3 of FIG. 2;

FIG. 4 is a partially broken-away top view thereof;

FIG. 5 is a cross-sectional view taken generally on line 5—5 in FIG. 4; and

FIG. 6 is a shortened cross-sectional view taken generally on line 6—6 in FIG. 4 and illustrating removal of the slicer cone.

DESCRIPTION OF THE PREFERRED EMBODIMENT

With reference to the drawings, FIG. 1 shows a prior art vegetable slicer 10 mounted upon and driven by a food mixer 11. Slicer 10 is supported and driven by a power take-off hub 12 which drives a slicer cone 14 within slicer 10 for processing pieces of food 15 placed in a chute 16 and pressed through the chute onto cone 14 by a pusher plate 18.

FIG. 2 illustrates a preferred embodiment 25 of a vegetable slicer constructed according to the present invention. Slicer 25 includes a slicer cone 14 as in the FIG. 1 prior art slicer 10. As also in prior art slicer 10, cone 14 is received within a frustoconical cavity 27 in the vegetable slicer housing 28, and is driven by a drive hub 29 having a drive shaft 31 which plugs into the power take-off hub 12. Cavity 27 has an open end 32 through which the cone 14 and drive hub 29 are inserted. After insertion the drive shaft 31 passes coaxially through the opposite end of cavity 27 for attachment to the power take-off hub 12. A latch 33 engages in a groove 34 in drive shaft 31 (FIGS. 4 and 5) to secure the drive shaft, dribe hub, and cone within the frustoconical cavity 27. In use, the power take-off hub 12 then rotates the drive hub and cone counterclockwise as shown by the arrows in FIGS. 3 and 5.

Slicer 25 includes a chute 36 corresponding to chute 16 in slicer 10, which opens into the frustoconical cavity 27 through a port 37 in the side of cavity 27. Mounted on a hinge 39 on housing 28 at the outside end 41 of chute 36, opposite port 37, is a divided pusher plate 40. Plate 40 hingedly moves into and out of the chute 36 through the chute end 41 to push vegetables and other foodstuffs through chute 36 and through port 37 against the slicer cone 14 to assist the processing of the foodstuffs. As illustrated, plate 40 is divided into two portions, a rear portion 40a and a front portion 40b, although further division into additional portions may be made if desired. Each of the portions has a respective handle 42a and 42b for moving the pusher plates within chute 36. On the ends of the pusher plate portions 40a and b opposite the handles 42a and b are faces 45a and 45b for engaging and pushing the foodstuffs through the corresponding portions of the chute through which the faces 45a and b move.

Between the handles 42a and b and faces 45a and b, each of the pusher plate portions 40a and b has a respective pusher plate divider wall 50a and 50b connected and extending from the faces 45a and b to their respective handles 42a and b. The divider walls close and separate each respective portion of the chute from the other when the respective pusher plate portion is positioned fully within the chute.

Thus, as may be seen, in FIG. 2, when pusher plate portion 40a is positioned fully in the chute, the capacity of the chute is effectively halved. That is, it is reduced by an amount equal to the volume of the chute swept by pusher plate face 45a. Foodstuffs then processed in slicer 25 move through the balance of chute 36 under the control of pusher plate portion 40b, for more expeditious handling of small-sized foodstuffs. The independently operable pusher plate portions 40a and 40b thus make it possible to provide customized processing of both large and small foodstuffs, including foodstuffs such as celery and carrot sticks which require specialized handling for the best results.

The present invention also provides additional advantages which include a splash ring 55 surrounding and spaced from the open end 32 of cavity 27 for catching food particles which fall or are centrifugally thrown from the edge of the slicer cone 14. A pouring spout 57 is formed in the lower edge of the splash ring 55 for discharging liquids. A pair of finger recesses 60 is formed in the splash ring adjacent and extending behind the outside edge of the slicer cone on opposite sides thereof at the open cavity end 32 for grasping the cone 14 (FIG. 6) and withdrawing it from the cavity when the latch 33 (FIG. 4) is released.

As may be seen, therefore, the present invention provides numerous advantages. With but a single housing 28 and a standard set of slicer cones, the divided pusher plate 40 provides far greater versatility and much more convenient processing of foodstuffs of many different sizes and shapes. These advantages are provided in an inexpensive, versatile, uncomplicated, and durable configuration which substantially increases the utility of prior art vegetable slicers.

Although the pusher plate is illustrated as being divided into two generally equal halves, it could just as readily be divided into two unequal portions, or it could be divided into more than two equal or unequal portions. Also, the handles of the respective portions may all be gripped together and then all of the pusher plate portions moved in unison when it is desired to process large-sized foodstuffs which require access to the full width of the chute.

While the form of apparatus herein described constitutes a preferred embodiment of this invention, it is to be understood that the invention is not limited thereto, and that changes may be made therein without departing from the scope of the invention.

What is claimed is:

1. In a vegetable slicer including a housing having a cavity therein, means for receiving a food processor within the cavity, a port connecting into the cavity for presenting foodstuffs to the food processor, and a chute attached to the port opposite the cavity for containing and guiding foodstuffs through the port to the food processor, the improvement comprising:
    (a) a plurality of adjacent pusher plate portions, each pusher plate portion having a face thereon for engaging and pushing foodstuffs to the processor through a corresponding portion of the chute,
    (b) mounting means mounting at least one of said pusher plate portions for independent and individual movement through the chute toward and away from the port as well as for movement in unison with said other pusher plate portions, and
    (c) at least one of said pusher plate portions having at least one divider wall movable therewith and facing at least one of its adjacent said pusher plate portions to close and separate the corresponding portion of the chute from each said adjacent pusher plate portions when said one pusher plate portion is positioned fully in the chute, said at least one pusher plate portion and its divider wall, when fully in the chute, obstructing access to said closed portion of the chute and consequently reducing the effective capacity of the chute by an amount equal to at least the volume of the chute swept by its respective pusher plate face, for more expeditious handling of small-sized foodstuffs, and said pusher plate portions and respective divider walls, when together fully removed from the chute, providing unobstructed access to the chute and restoration of the effective capacity of the chute to the full volume of the chute swept by the respective pusher plate faces when moved in unison, for more expeditious handling of large-sized foodstuffs.

2. The device of claim 1 wherein said mounting means further comprises hinge means mounting said pusher plate portions on the slicer for hingedly moving into and out of the chute through the end thereof opposite the port.

3. The device of claim 1 further comprising handle means on said pusher plate portions for manually moving said portions through the chute.

4. The device of claim 1 wherein the cavity is a frustoconical cavity, and wherein the food processor comprises a slicer cone and means for mounting said slicer cone coaxially within the cavity through one end thereof.

5. The device of claim 4 further comprising a splash ring surrounding and spaced from said one end of said cavity.

6. The device of claim 5 further comprising means forming a pouring spout in said splash ring.

7. The device of claim 5 further comprising means forming at least one finger recess in said splash ring adjacent and extending behind said slicer cone for grasping and withdrawing said cone from said cavity.

8. In a vegetable slicer including a housing having a frustoconical cavity therein, means for mounting a slicer cone coaxially within the cavity through one end thereof and a drive shaft coaxially through the opposite end, a port through the side of the cavity for presenting foodstuffs to the slicer cone for processing thereby, and a chute attached to the port opposite the cavity for containing and guiding foodstuffs through the port onto the cone, the improvement comprising:
   (a) hinged pusher plate mounting means,
   (b) a first pusher plate portion mounted on said mounting means for hingedly moving into and out of the chute through the end thereof opposite the port,
   (c) said first pusher plate portion having a face thereon for engaging and pushing foodstuffs through a corresponding first portion of the chute and against the slicer cone as said first pusher plate portion is moved into the chute,
   (d) a second pusher plate portion mounted on said mounting means adjacent and independently of said first pusher plate portion for hingedly moving into and out of the chute through the end thereof opposite the port, said first and second pusher plate portions also being movable in unison into and out of the chute,
   (e) said second pusher plate portion having a face thereon for engaging and pushing foodstuffs through a corresponding second portion of the chute and against the slicer cone as said second pusher plate portion is moved into the chute, said second portion of the chute being the balance thereof apart from said first portion,
   (f) a first pusher plate divider wall connected to and extending from said first pusher plate face and movable therewith adjacent said second pusher plate portion to close and separate said first portion of the chute from the second when said first pusher plate portion is positioned fully in the chute, and
   (g) a second pusher plate divider wall connected to and extending from said second pusher plate face and movable therewith adjacent said first pusher plate divider wall to close and separate said second portion of the chute from the first when said second pusher plate portion is positioned fully in the chute, each pusher plate portion and its respective divider wall, when fully in the chute, obstructing access to said closed portion of the chute and consequently reducing the effective capacity of the chute by an amount equal to the volume of the chute swept by its respective pusher plate face, for more expeditious handling of small-sized foodstuffs, and said pusher plate portions and respective divider walls, when together fully removed from the chute, providing unobstructed access to the chute and restoration of the effective capacity of the chute to the full volume of the chute swept by the respective pusher plate faces when moved in unison, for more expeditious handling of large-sized foodstuffs.

9. The device of claim 8 further comprising:
   (a) a splash ring surrounding and spaced from said one end of said cavity,
   (b) means forming a pouring spout in said splash ring, and
   (c) means forming at least a pair of finger recesses in said splash ring adjacent and extending behind said slicer cone on opposite sides of said one end of said cavity for grasping and withdrawing said cone from said cavity.

* * * * *